UNITED STATES PATENT OFFICE.

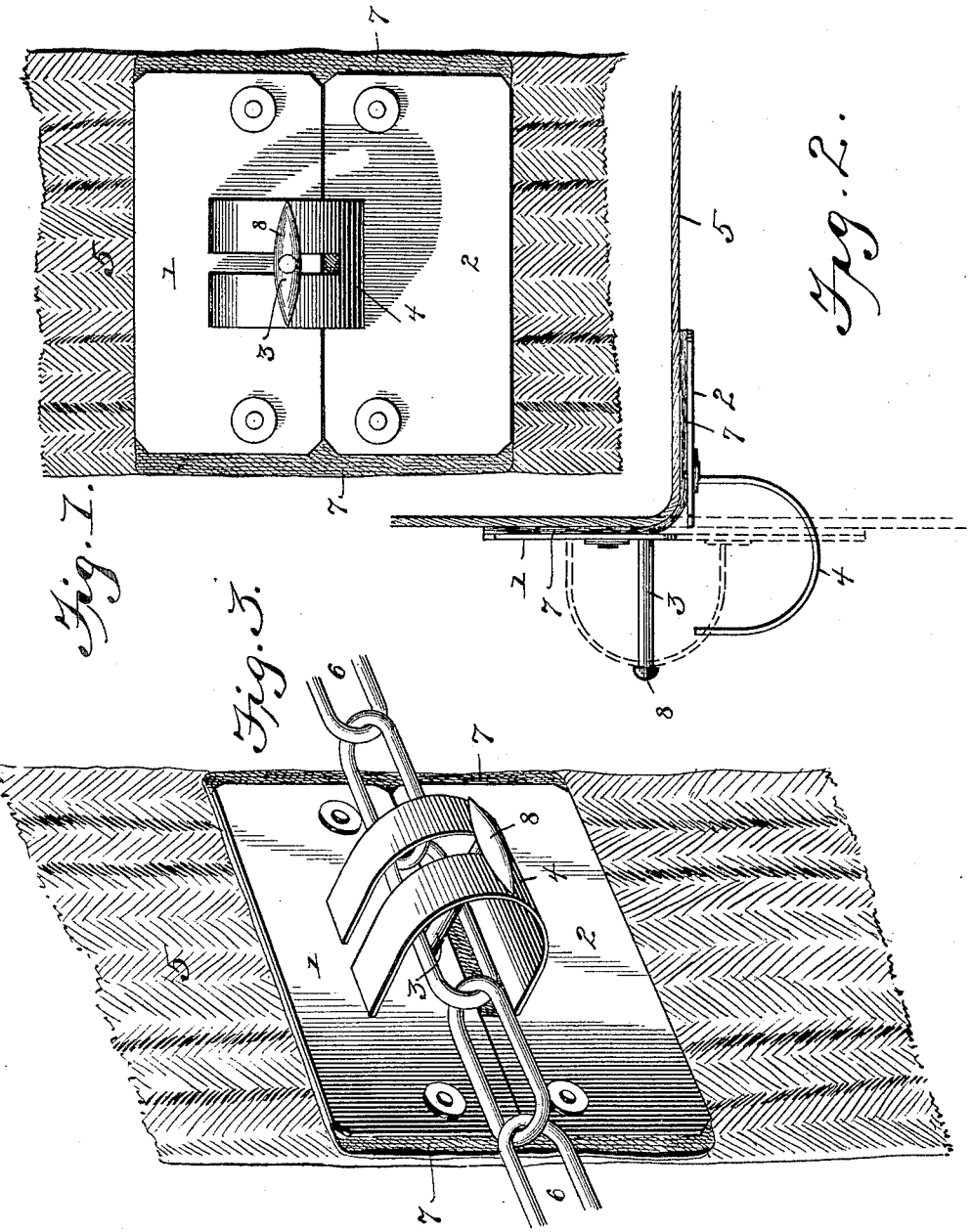

DAVID P. SKELTON AND ROBERT S. SKELTON, OF SCOTTSBOROUGH, ALABAMA.

BACK-BAND HOOK.

SPECIFICATION forming part of Letters Patent No. 581,782, dated May 4, 1897.

Application filed January 27, 1897. Serial No. 620,933. (No model.)

*To all whom it may concern:*

Be it known that we, DAVID P. SKELTON and ROBERT S. SKELTON, citizens of the United States, residing at Scottsborough, in the county of Jackson and State of Alabama, have invented a new and useful Back-Band Hook, of which the following is a specification.

This invention relates to back-band hooks or trace-carriers.

By this invention the trace-chain is securely and firmly held in place and will not become detached from the back-band except at the will of the attendant, and then only by a positive movement of the component parts of the device forming the invention.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a front view of a back-band and trace-carrier embodying the features of this invention. Fig. 2 is an edge view showing the parts relatively turned to release the trace or admit of the same being placed in position, the dotted lines showing the normal position of the parts. Fig. 3 is a perspective view showing the invention applied.

Corresponding and like parts are referred to in the following description and indicated in the several views of the drawings by the same reference-characters.

The back-band hook or trace-carrier is composed, essentially, of two plates 1 and 2, the plate 1 having a headed pin or stud 3, and the plate 2 being provided with an approximately semicircular guard 4, which is slotted to receive the headed end of the pin or stud 3. These separate and independent plates 1 and 2 are attached to the back-band 5 by rivets or other suitable fastenings, so as to be capable of turning on a line corresponding with their inner or meeting edges, whereby the guard 4 may be thrown out of engagement or away from the pin or stud 3, as indicated in Fig. 2, so as to admit of the trace 6 being placed in position or removed from the pin, as required. In order to secure the requisite stiffness, reinforcing-pieces 7, of leather or other material, are applied to the back-band opposite the plates 1 and 2, and are secured in place by the same fastenings employed for attaching the parts of the trace-carrier to the back-band. The best results are attained by placing a reinforcing-piece 7 on each side of the back-band; but, if desired, one may be omitted.

The pin or stud 3 may be applied to the plate 1 in any desired manner, but it is preferred to cast it with the said plate; and this pin is provided at its outer end with a cross-piece or T-head 8, which is adapted to overlap the portions of the guard bordering upon the slot.

The guard 4 is an integral part of the plate 2 and is approximately of semicirclar form and has a slot 9 to receive the headed end of the pin or stud 3, and extends over the trace and prevents accidental disengagement thereof from the pin or stud 3. When the plates 1 and 2 are in line, the free end of the guard 4 touches the plate 1, as clearly indicated by the dotted lines in Fig. 2. When placing the trace in position or removing it from the pin or stud, the plate 2 is turned with reference to the plate 1 so as to disengage the guard from the pin or stud, as clearly indicated by the full lines in Fig. 2, and when the trace is in position the guard will assume the position shown most clearly in Fig. 3, thereby holding the trace in place against accidental disengagement. The reinforcing-pieces 7, jointly with the back-band, serve to maintain the plates 1 and 2 in normal position, as will be readily understood.

Having thus described the invention, what is claimed as new is—

1. In a back-band hook or trace-carrier, the combination of independent plates, a pin or stud provided on one plate, and an approximately semicircular guard provided on the other plate and adapted to coöperate with the said pin or stud and overlap the plate bearing the said stud, substantially as set forth for the purpose described.

2. In a back-band hook or trace-carrier, the combination of independent plates, a headed pin or stud provided on one plate, and an approximately semicircular guard provided on the other plate and having a slot to receive the headed end of the pin or stud, substantially as set forth for the purpose described.

3. In a back-band hook or trace-carrier, the combination of a plate having an integral pin or stud formed with a T-head, and a second plate having an integral guard of approximately semicircular form provided with a slot to coöperate with the headed end of the pin or stud, substantially in the manner and for the purpose specified.

4. In combination, a back-band, a reinforcing-piece applied thereto, independent plates secured to the reinforcing-piece and back-band, a headed pin or stud provided on one of the plates, and a guard of approximately semicircular outline provided on the other plate and having a slot to receive the headed end of the pin or stud and adapted to overlap the first-mentioned plate, substantially as shown for the purpose specified.

In testimony that we claim the foregoing as our own we have hereto affixed our signatures in the presence of two witnesses.

DAVID P. SKELTON.
ROBERT S. SKELTON.

Witnesses:
J. A. KYLE,
W. B. SKELTON.